United States Patent [19]

Wolff et al.

[11] Patent Number: 5,143,962

[45] Date of Patent: Sep. 1, 1992

[54] METHOD OF GRANULATING RESORCINOL/SILICA MIXTURES, THE GRANULATES OBTAINED IN THIS MANNER AND THEIR USE

[75] Inventors: Siegfried Wolff, Bornheim-Mertin; Udo Görl, Meckenheim; Karl Meier, Alfter, all of Fed. Rep. of Germany

[73] Assignee: Degussa AG, Fed. Rep. of Germany

[21] Appl. No.: 676,337

[22] Filed: Mar. 28, 1991

[30] Foreign Application Priority Data

Apr. 26, 1990 [DE] Fed. Rep. of Germany ....... 4013258

[51] Int. Cl.⁵ .......................... C08K 5/13; C08K 3/36; C08L 61/12
[52] U.S. Cl. .................................. 524/346; 524/492; 524/493; 524/511; 156/307.7; 156/565; 156/910
[58] Field of Search ............... 524/346, 492, 493, 511, 524/575.5

[56] References Cited

U.S. PATENT DOCUMENTS 3,751,331 8/1973 Dane et al. .......................... 524/493
3,778,406 12/1973 Klötzer et al. ...................... 524/493

*Primary Examiner*—Paul R. Michl
*Assistant Examiner*—Peter Szekely
*Attorney, Agent, or Firm*—Cushman, Darby & Cushman

[57] ABSTRACT

A method of granulating resorcinol/silica mixtures which comprises transporting a mixture of resorcinol and precipitated silica by conveyor worms to two pressing rollers whose shafts are attached vertically above one another and whose contact pressure can be varied, compacting said mixture between said rollers, breaking up the compacted mixture with a cake breaker to obtain a granulate with minimum grain size and separating the remaining dusty portion of said mixture. The mixtures can be added to vulcanizable rubber to provide improved adhesion to rubber reinforcements.

6 Claims, No Drawings

METHOD OF GRANULATING RESORCINOL/SILICA MIXTURES, THE GRANULATES OBTAINED IN THIS MANNER AND THEIR USE

The present resent invention relates to a method of granulating resorcinol/silica mixtures, the granulates obtained in this manner and their use.

BACKGROUND OF THE INVENTION

Adhesion reinforcers are used for improving the adhesion between textile reinforcements (polyamide, aramide, cellulose, polyester) or steel reinforcements (smooth, galvanized, brass-plated steel) and rubber articles such as tires, conveyor belts, hoses, etc. There are two possibilities available when the adhesive agent is added directly to the raw rubber mixture (dry bonding). The bivalent salts of cobalt (e.g. cobalt naphthenate) or resorcinol/formaldehyde/silica systems are used in the case of steel cord (e.g. steel belts in tires, high-pressure hoses, conveyor belts with steel insert) whereas in the case of textile cord only the latter system is used.

Both systems have disadvantages. The cobalt system provides poor aging behavior and rubber poison. The resorcinol/formaldehyde/silica system leads to rather high mixing viscosity and embrittlement of the mixture due to the formation of resin. Therefore, a combination of both systems is often used in order to partially eliminate the disadvantages of the individual systems.

At the start of the development of the resorcinol/formaldehyde/silica systems, there was a problem because of poor dispersing behavior of resorcinol, which can only be improved by using a mixing temperature of approximately 120° C. (melting point of resorcinol). However, these high temperatures are not achieved in practice in all mixtures.

One possibility of solving this problem is the fine grinding of resorcinol with silica as described in German patent 1,301,478 and realized in the Degussa adhesive system Cofill ® 11.

However, a product is produced in the grinding process which can result in problems during processing because of the development of dust if insufficient protective devices are present.

For this reason, projects for developing a dust-free product were undertaken; however, they have not resulted in any success in the past.

In this connection, the problems which result during the granulation of fine, powdery substances such as e.g. precipitated silicas are generally known. Since standard granulating methods were not successful, special methods were developed in which the fine substances were precompressed and formed at the same time (See German patent 18 07 714, EP-A-0 173 061 (U.S. Pat. No. 4,807,819)). However, the assumption that these methods could also be used with silica/resorcinol mixtures was not correct. Only a very coarse, lumpy granulate was obtained which was very difficult to disperse.

SUMMARY OF THE INVENTION

The object of the present invention is to provide a mixture of resorcinol and silica in granulate form which is distinguished by very low dusting and by good dispersing behavior in rubber mixtures.

The invention provides a method for granulating of resorcinol/silica mixtures in which mixtures of 5 to 95 % by weight resorcinol and 5 to 95 % by weight precipitated silica are transported by conveyor worms to two pressing rollers whose shafts are attached vertically above one another and whose contact pressure can be varied. The mixtures are compacted between those rollers, then a granulate with the desired maximum grain size is obtained with the aid of a cake breaker and the remaining dusty portion is separated.

The contact pressure of the rollers, whose surface can be smooth or structured, is adjusted to between 6 and 105 bars, especially 6 to 25 bars. A granulating press which can be used is described in DE-OS 1 778 089 — cake breaker and sieves or sieve cascades suitable for separating the dusty component are likewise generally known. The separated dust is recycled into the materials about to undergo granulation.

The precipitated silicas used have a specific surface of 1 to 1000 m$^2$/g, especially 100 to 250 m$^2$/g (determined according to BET with nitrogen, DIN 66131). They are silicas which are in general use in the rubber art.

The invention also provides granulates consisting of resorcinol and precipitated silica which have a content of 5 to 95 % by weight resorcinol and 5 to 95 % by weight precipitated silica, especially 50 % by weight each of silica and of resorcinol, with a grain size of 0.063 mm to 10 mm, especially 1 to 5 mm (<70 % by weight) and a bulk weight of 250 to 500 g/l, especially 350 to 450 g/l. This granulate is distinguished over a powdery mixture of resorcinol and silica by the following properties:

1) It is practically dust-free, that is, a maximum of 6 % by weight of the granulates have a grain size <0.125 mn (at about 10 bars a maximum of 5 %).
2) The bulk weight, which is clearly increased in contrast to the powdery mixture (about 200 g/l) makes optimum handling and better storage possible.
3) It can be stored in silos and can be transported.
4) It has better dispersing behavior in the rubber mixtures to be vulcanized and
5) It provides better adhesion between the textile reinforcement or steel reinforcement and the rubber.

The granulates produced in accordance with the invention are used in known vulcanizable rubber mixtures containing resorcinol and silica.

The mixtures described in German patent 1 078 320 and in J. Sprung, K. Burmester, Kautschuk und Gummi 33 (1980), pp. 611-616 are cited by way of example.

The adhesive reinforcement is based on the formation of a resorcinol/formaldehyde resin. To this end, the mixture must contain, in addition to the resorcinol/silica granulate of the invention (amount of resorcinol used in the mixture between 0.5–10 GT (GT ≈ parts by weight), preferably 1.5–5 GT), a formaldehyde donor (e.g. Hexa K from Degussa or Cohedur ® A from Bayer) in amounts of 0.5–10 GT, preferably 1–3 GT. In addition, more silica (amount between 1–50 GT, preferably 10–15 GT) above the amount which is already present in the granulate of the invention is required for a good adhesion, especially on steel cord.

Suitable types of rubber for use with the invention include rubbers which can be cross-linked with sulfur and vulcanization accelerator(s) to produce elastomers, including mixtures of such rubbers. This includes in particular the halogen-free rubber types, preferably the so-called diene elastomers. These rubber types include e.g. oil-extended natural and synthetic rubbers such as natural rubbers, butadiene rubbers, isoprene rubbers, butadiene-styrene rubbers, butadiene-acrylonitrile rubbers, butyl rubbers, terpolymers of ethylene, propylene and non-conjugated dienes. Moreover, the following additional rubbers can also be considered for rubber mixtures with the rubbers mentioned above:

Carboxyl rubbers, epoxide rubbers, transpolypentenamer, halogenated butyl rubbers, rubbers from 2-chloro-butadiene, ethylene-vinyl acetate copolymers, optionally also chemical derivatives of natural rubber and modified natural rubbers.

In addition, the rubber mixtures provided with the resorcinol/silica granulate of the invention can contain other components customary in the rubber industry such as e.g. (GT parts by weight):

Customary reinforcing systems, that is, furnace blacks, channel (impingement) blacks, flame blacks, thermal blacks, acetylene blacks, arc blacks, CK blacks, etc. as well as synthetic fillers such as silicas, silicates, aluminum oxide hydrates, calcium carbonates and natural fillers such as clays, siliceous chalks, chalks, talcs etc. as well as silane-modified fillers, Vulcanization accelerators customarily used in the rubber industry (e.g. sulfenamrde, MBT (meraptobenzothiazole), MBTS(2,2-dibenzothiazyldisulfide), triazine accelerators, thiurames) alone or in a mixture in amounts of 0.1 to 10 GT relative to 100 GT rubber, Vulcanization retarders such as e.g. Vulkalent ® E, PVI, likewise in amounts of 0.1 to 10 GT relative to 100 GT rubber, ZnO and stearic acid as vulcanization promoters in amounts of 0.5 to 10 GT rubber, Aging agents, antiozonants, antifatigue agents such as e.g. IPPD(N-isopropyl-N'-phenyl-p-phenylenediamine), TMQ(2,2,4-trimethyl-1,2-dihydroquinoline) as well as waxes as light stabilizers and their blends, Any softeners desired such as e.g. aromatic, naphthenic, paraffinic, synthetic softeners and their blends, Optional silanes such as e.g. bis-(3-triethyxysilyl-propyl)-tetrasulfane, γ-chloropropyltriethoxysilane, γ-mercaptopropyltrimethoxysilane, vinyl trialkoxysilanes and their blends in an amount of 0.1 to 20 GT, preferably 1 to 10 GT per 100 GT filler, Optional sulfur in an amount of 0.1 to 10 GT per 100 GT rubber, Optional dyes and auxiliary processing agents in the customary amounts.

The production of the mixture takes place in the manner known in the rubber industry in a closed mixer or on a rolling mill.

The use of the granulates of the invention includes adhesive mixtures such as those customarily used in tire construction, e.g. in the areas of the belt, carcass and annular ring as well as to industrial items with a reinforcing carrier made of textile cord or steel cord, that is, e.g. conveyor belts, V-belts, hoses, and partially to seals and rubber-coated fabrics.

| Test standards for use | Test method | Units |
|---|---|---|
| Dmax-Dmin | DIN 53529 | Nm |
| MS t35 (130° C.) | DIN 53524 | min. |
| Tensile strength | DIN 53504 | MPa |
| Tensile modulus | DIN 53504 | MPa |
| Tear Resistance | DIN 53507 | N/mm |
| Impact resilience | DIN 53512 | % |
| Shore-A-hardness | DIN 53505 | — |
| Adhesion Brass-plated and smooth steel cord | | steel cord vulcanized in in a length of 1 cm is torn out on a stress-strain machine (N/cm) |

The following names and abbreviations are used in the examples, the meaning of which is listed here.

| | |
|---|---|
| RSS 1 | ribbed smoked sheet (natural rubber) |
| Natsyn ® 2200 | polyisoprene rubber |
| CORAX ® N 330 | carbon black, surface (BET: 82 m²/g) Degussa |
| Ultrasil ® VN 3 gran. | precipitated silica, surface 175 m²/g |
| Naftolen ® ZD | aromatic softener |
| Vulkanox ® HS | 2,2,4-trimethyl-1,2-dihydro-quinoline (Bayer) |
| Hexa K | hexamethylene tetramine (Degussa) |
| Vulkacit ® DZ | benzothiazyl-2-dicyclohexyl-sulfenamide powdery |
| Cofill ® 11 | mixture of resorcinol/VN 3 50:50 Degussa |
| Crystex ® OT 20 A | insoluble sulfur |
| BS I | resorcinol/VN 3 gran., 50:50, produced at 12 bars contact pressure, density 385 g/l |
| BS II | resorcinol/VN 3 gran., 50:50, produced at 17 bars contact pressure, density 400 g/l |
| BS III | resorcinol/VN 3 gran., 50:50, produced at 25 bars contact pressure, density 410 g/l |

Granulation of a resorcinol/silica mixture 100 kg Cofill ® 11 (resorcinol/VN3 50 : 50) are fed by means of an optionally evacuatable double worm into the slot between the rollers running in opposite direction. The roller pressure was adjusted to 17 bars. Then, the comminution of the cakes exiting from the roller slot to a granulate size of 5 mm took place by means of a two-stage breaker. The broken granulate is dedusted by means of a zigzag sifter by blowing in air. The dust is fed back into the compacting process pneumatically.

| Grain size distribution of the granulate | | | |
|---|---|---|---|
| Fraction | BS I 6–12 bars | BS II 17 bars | BS III 25 bars |
| <0.125 mm | 5.82 | 4.15 | 4.38 |
| 0.125–0.5 mm | 6.04 | 4.05 | 4.62 |
| 0.0.5–1.0 mm | 13.85 | 14.00 | 13.45 |
| 1.0–2.0 mm | 31.04 | 29.53 | 28.72 |
| 2.0–3.0 mm | 29.55 | 31.35 | 33.10 |
| 3.0–4.0 mm | 10.65 | 12.80 | 12.25 |
| >4.0 ≦ 5.0 | 3.05 | 3.32 | 3.48 |

| Test of resorcinol/silica granulate (BS I, BS II, BS III) versus Cofill ® 11 in a steel cord adhesive mixture | | | | | |
|---|---|---|---|---|---|
| | 1 | 2 | 3 | 4 | 5 |
| RSS 1 | 30 | 30 | 30 | 30 | 30 |
| Natsyn ® 2200 | 70 | 70 | 70 | 70 | 70 |
| CORAX ® N 330 | 45 | 45 | 45 | 45 | 45 |
| Ultrasil ® VN 3 gran. | 12.5 | 12.5 | 12.5 | 12.5 | 12.5 |
| ZnO RS | 8 | 8 | 8 | 8 | 8 |
| Stearic acid | 1 | 1 | 1 | 1 | 1 |
| Naftolen ® ZD | 3 | 3 | 3 | 3 | 3 |
| Vulkanox ® HS | 1 | 1 | 1 | 1 | 1 |
| Cofil ® | — | 5 | — | — | — |
| BS I (12 bars) | — | — | 5 | — | — |
| BS II (17 bars) | — | — | — | 5 | — |
| BS III (25 bars) | — | — | — | — | 5 |
| Hexa K | 1.5 | 1.5 | 1.5 | 1.5 | 1.5 |
| Vulkacit ® DZ | 0.7 | 0.7 | 0.7 | 0.7 | 0.7 |
| Crystex ® OT 20 A | 5 | 5 | 5 | 5 | 5 |

|  | Rheometer test at 145° C. | | | | |
| --- | --- | --- | --- | --- | --- |
|  | 1 | 2 | 3 | 4 | 5 |
| Dmax-Dmin (Nm) | 14.28 | 15.26 | 15.24 | 15.21 | 15.68 |
| MS t 35 (min.) | 14.3 | 17.4 | 18.1 | 18.2 | 19.1 |
| Modulus 300 (MPa) | 14.1 | 16.5 | 19.9 | 19.6 | 19.7 |
| Tear resistance (N/mm) | 17 | 16 | 18 | 17 | 18 |
| Elasticity (%) | 43 | 40 | 43 | 41 | 41 |
| Hardness | 73 | 81 | 81 | 82 | 82 |
| Adhesion (N/cm) Brass-plated steel cord average value of 10 measurements | 219 | 362 | 388 | 391 | 376 |
| Adhesion (N/cm) Smooth steel cord (average value of 10 measurements) | 78 | 154 | 167 | 169 | 172 |

The foregoing example shows that while the other values are almost identical, the adhesion values in the case of the granulate are up to more than 11 per cent higher than in the case of Cofill ® powder.

What is claimed is:

1. A method of granulating resorcinol/silica mixtures which comprises transporting a mixture of 5 to 95 % by weight resorcinol and 5 to 95 % by weight precipitated silica by conveyor worms to two pressing rollers whose shafts are attached vertically above one another and whose contact pressure can be varied, compacting said mixture between said rollers, breaking up the compacted mixture with a cake breaker to obtain a granulate with maximum grain size and separating the remaining dusty portion of said mixture.

2. A granulate consisting of resorcinol and precipitated silica with a content of 5 to 95 % by weight resorcinol and 5 to 95 % by weight precipitated silica, a grain size between 0.063 mm and 10 mm and a bulk weight of 250 to 550 g/l made by the process of claim 1.

3. A vulcanizable rubber mixture comprising a vulcanizable rubber, sulfur and the granulate of claim 2 in an amount sufficient to provide 1 to 10 parts by weight of resorcinol per 100 parts by weight of rubber.

4. A vulcanizable rubber mixture as set forth in claim 3 in which the amount of said granulate is such that there are 1.5 to 5 parts by weight resorcinol per 100 parts by weight rubber.

5. A vulcanizable rubber mixture as set forth in claim 3 including a formaldehyde donor in an amount of 0.5 to 10 parts by weight for each 0.5 to 10 parts by weight of resorcinol.

6. A vulcanizable rubber mixture as set forth in claim 5 in which the amount of formaldehyde donor is 1 to 3 parts by weight of formaldehyde donor for each 0.5 to 10 parts by weight of resorcinol.

* * * * *